(12) United States Patent
Ding et al.

(10) Patent No.: US 11,879,869 B2
(45) Date of Patent: Jan. 23, 2024

(54) METHOD FOR PREDICTING SURFACE QUALITY OF BURNISHING WORKPIECE

(71) Applicant: ZHEJIANG UNIVERSITY OF TECHNOLOGY, Zhejiang (CN)

(72) Inventors: Cong Ding, Zhejiang (CN); Shiqing Feng, Zhejiang (CN); Zhongyu Piao, Zhejiang (CN); Zhipeng Yuan, Zhejiang (CN); Jing Liu, Zhejiang (CN)

(73) Assignee: ZHEJIANG UNIVERSITY OF TECHNOLOGY, Zhejiang (CN)

( * ) Notice: Subject to any disclaimer, the term of this patent is extended or adjusted under 35 U.S.C. 154(b) by 0 days.

(21) Appl. No.: 18/352,263

(22) Filed: Jul. 14, 2023

(65) Prior Publication Data
US 2023/0366855 A1 Nov. 16, 2023

Related U.S. Application Data

(63) Continuation of application No. PCT/CN2023/093207, filed on May 10, 2023.

(30) Foreign Application Priority Data

May 13, 2022 (CN) .......................... 202210517894.6
May 26, 2022 (CN) .......................... 202210581013.7

(51) Int. Cl.
*G01N 29/12* (2006.01)
*G06N 20/10* (2019.01)

(52) U.S. Cl.
CPC ............. *G01N 29/12* (2013.01); *G06N 20/10* (2019.01)

(58) Field of Classification Search
CPC .............................. G01N 29/12; G06N 20/10
(Continued)

(56) References Cited

U.S. PATENT DOCUMENTS 9,662,765 B2 * 5/2017 Hüning .................. B24B 1/002
11,712,773 B1 * 8/2023 Goettler ................. G06Q 30/06
                                                        700/173
(Continued)

FOREIGN PATENT DOCUMENTS

CN       107462785       12/2017
CN       112749506        5/2021
(Continued)

*Primary Examiner* — Jacques M Saint Surin
(74) *Attorney, Agent, or Firm* — JCIPRNET

(57) ABSTRACT

Disclosed is a method for predicting surface quality of a burnishing workpiece. The method includes the steps: using vibration sensors and signal acquisition instrument to acquire vibration signals generated on a surface of the burnishing workpiece during machining, evaluating the surface quality of the burnishing workpiece based on a coupling coordination degree model, processing signals by using an ensemble empirical mode decomposition method, identifying power spectral density, kurtosis and form factor as signal characteristics, identifying a support vector machine as a decision-making model, optimizing penalty parameters and kernel function parameters by using the Bayesian optimization method, and establishing the relationship between the signal characteristics and the surface quality. The method can quickly identify the signal characteristics for evaluating the workpiece surface quality, thereby improving the workpiece surface quality by intervening in process parameters, making up for the technical defect that condition monitoring cannot be performed during the machining process.

5 Claims, 7 Drawing Sheets

(58) Field of Classification Search
USPC .......................................................... 73/579
See application file for complete search history.

(56) References Cited

U.S. PATENT DOCUMENTS

| | | | | |
|---|---|---|---|---|
| 2007/0220727 A1* | 9/2007 | Cheatham | ............... | B24B 39/00 |
| | | | | 29/90.01 |
| 2009/0277541 A1* | 11/2009 | Bamberg | ................ | F01D 5/286 |
| | | | | 148/558 |
| 2015/0047562 A1* | 2/2015 | Hirota | .................... | B05C 5/0279 |
| | | | | 118/313 |

FOREIGN PATENT DOCUMENTS

| | | | | | |
|---|---|---|---|---|---|
| DE | 112016006999 | * | 2/2019 | ............. | E02F 9/267 |
| DE | 112021000809 | * | 12/2022 | ....... | G05B 19/41875 |

* cited by examiner

METHOD FOR PREDICTING SURFACE QUALITY OF BURNISHING WORKPIECE

CROSS-REFERENCE TO RELATED APPLICATION

This application is a continuation of international application of PCT application serial no. PCT/CN2023/093207 filed on May 10, 2023, which claims the priority benefits of China application no. 202210517894.6 filed on May 13, 2022 and China application no. 202210581013.7 filed on May 26, 2022. The entirety of each of the above mentioned patent applications is hereby incorporated by reference herein and made a part of this specification.

TECHNICAL FIELD

The present disclosure relates to the technical field of metallic material surface strengthening, in particular to a method for predicting surface quality of a burnishing workpiece.

BACKGROUND

Ultrasonic burnishing processing is a machining technology which utilizes ultrasonic waves to perform high-frequency impact on a workpiece based on the traditional burnishing technology, so as to strengthen the surface of the workpiece. The combination of ultrasonic vibration and burnishing force enables residual tensile on the workpiece surface of to be transformed into residual compressive stress, which improves the fatigue strength of the workpiece, so that the service life of the workpiece is prolonged. After ultrasonic burnishing process, grains on the surface layer of the workpiece are refined and a gradient nano-layered structure is formed, so that the surface roughness of the workpiece is reduced, and corrosion resistance and wear resistance of the workpiece are greatly improved.

However, after the burnishing processing of the workpiece is completed, testers usually measure microstructure, residual stress, hardness and surface roughness by using electron microscopes, X-ray diffractometers, nanoindenters, white-light interferometers or other apparatuses, however, such process includes a series of steps such as acetone cleaning, sandpaper polishing and acid reagent corrosion, which prolongs the testing cycle and leads to low efficiency. At the same time, metallic materials to be processed, especially cast magnesium alloys, have pores, cracks, and other inherent defects, workpieces processed therefrom are of microscopic unevenness on surfaces, which easily cause fatigue failure. Therefore, it is particularly important to monitor the surface quality of a workpiece online and optimize timely. More important, ultrasonic burnishing processing is a nonlinear dynamical system, and various factors such as process parameters, system state and quality indexes interact with one another in the burnishing process, making the system suffer chaotic characteristics, including initial value sensitivity, internal randomness, and the like, that is, a minor disturbance in the system in the machining process can cause significant differences in surface quality. Therefore, it is necessary to intervene in related process parameters in the machining process, so as to improve the workpiece surface quality.

SUMMARY

Aiming at the defects in the prior art, the present disclosure provides a method for predicting surface quality of a burnishing workpiece, which can effectively overcome technical defects that state monitoring cannot be performed in the machining process, and quickly determine whether a surface quality is superior or inferior in real time, so as to prevent surface quality defects caused by improper selection of process parameters during machining.

The objective of the present disclosed is implemented by the following technical solutions:

a method for predicting surface quality of a burnishing workpiece, including the following steps:

Step 1: installing a vibration signal measurement and acquisition device on a burnishing processing platform;

Step 2: determining main influencing factors affecting surface quality of a burnishing workpiece and the number of each influencing factor, designing orthogonal tests with different combinations of influencing factors and levels, performing burnishing tests and acquiring vibration signals, carrying out a comprehensive evaluation of the surface quality of the burnishing workpiece based on a coupling coordination degree model, and classifying the burnishing workpiece according to the comprehensive evaluation results;

Step 3: dividing vibration signals in different scales by using the ensemble empirical mode decomposition method to achieve noise reduction; and selecting component signals without noise interference for superposition, and calculating the time-frequency domain characteristics of superposed signals;

Step 4: selecting a support vector machine as a decision-making model of the workpiece surface quality, selecting a radial basis function as a kernel function, determining an optimal selection range of penalty parameters and kernel function parameters, and optimizing these two parameters based on Bayesian optimization method to obtain a best value;

Step 5: taking the time-frequency domain characteristics of the signals obtained in the Step 3 as input layer nodes of the support vector machine, taking the surface quality classification results obtained in the Step 2 as output layer nodes thereof to train the support vector machine and obtain a trained support vector machine, so that the relationship between the signal characteristics and the surface quality of the burnishing workpiece is established; and Step 6: carrying out Step 3 for the vibration signals collected online in the burnishing test, and taking the time-frequency domain characteristics finally obtained as input layer nodes of the trained support vector machine to obtain the surface quality of the burnishing workpiece output from the support vector machine.

Further, in the Step 1, the vibration signal measurement and acquisition device includes two vibration sensors and one signal acquisition instrument, where the two vibration sensors are respectively used to monitor vibration signals on a machining direction and a vertical direction of the burnishing workpiece, and the signal acquisition instrument is used to acquire such signals.

Further, in the Step 2, rotational speed, feed speed and burnishing depth are taken as main influencing factors affecting the workpiece surface quality.

Further, in the Step 2, a comprehensive evaluation of the surface quality index of the burnishing workpiece is conducted based on a coupling coordination degree model, and the burnishing workpiece can be classified according to the comprehensive evaluation results, with specific steps as follows:

(1) taking surface roughness increase and hardness increase as analysis items of the coupling coordination degree model;
(2) setting weights of the surface roughness increase and the hardness increase, performing interval processing on data of the analysis items, and ensuring the data after the processing fall between 0 and 1;
(3) calculating a coupling degree, a coordination index and a coupling coordination degree, and classifying the coupling coordination degree in combination with classification criteria for the coupling coordination degree grading; and
(4) classifying the burnishing workpiece according to the coupling coordination degree. When the coupling coordination degree is maladjustment, the surface quality of the burnishing workpiece is poor, otherwise, the surface quality of the burnishing workpiece is excellent.

Further, the Step 3 is implemented through the following sub-steps:
(1) adding small-amplitude white noise signals to the vibration signals several times, and adding random seeds to maintain consistency of decomposition results:
(2) dividing the vibration signals in time scale after multiple additions of white noise by using the empirical mode decomposition method to obtain component signals;
(3) plotting a power spectrum of each component signal and comparing the shape of the power spectrum of each component signal;
(4) selecting the power spectrum of each component signal with a smooth shape, that is, the component signals without noise interference, and superimposing these signals to obtain superimposed signals; and
(5) identifying power spectral density, kurtosis and form factor as the time-frequency domain characteristics of the superimposed signals, and estimating the power spectral density of the superimposed signals based on the maximum entropy method.

Further, selection ranges of the penalty parameters C and kernel function parameters $\gamma$ in the Step 4 are set to $0.001<C<1000$ and $0.001<\gamma<1000$, respectively.

Further, in the Step 5, when an output value of the support vector machine is set to be +1 when the surface quality of the burnishing workpiece is excellent, and the output value of the support vector machine is set to be −1 when the surface quality is poor.

The present disclosure has the following beneficial effects:
(1) The method of the present disclosure provides a comprehensive evaluation of the surface quality index of the burnishing workpiece based on the coupling coordination degree model, which can not only reflect whether the surface roughness increase and the hardness increase have a good level, but also further study an internal correlation mechanism between the surface roughness increase and the hardness increase, so that the surface quality can be evaluated qualitatively and quantitatively to classify the burnishing workpiece into two categories.
(2) The method of the present disclosure combines the ensemble empirical mode decomposition method with the shapes of the power spectrum of component signals to achieve noise reduction processing, which can eliminate invalid information components and recombine remaining effective components to obtain pure vibration signals, thereby extracting true characteristics of the signals.
(3) The method of the present disclosure selects the maximum entropy method to estimate the power spectral density, which has high frequency resolution, can accurately distinguish frequency components in the signals, and features low complexity, rapid processing, thereby being capable of meeting the requirements of online prediction in real time.
(4) The method of the disclosure simultaneously selects power spectral density, kurtosis and form factor as signal characteristics, and makes analysis in conjunction with the time-frequency domain characteristics of the signals. The power spectral density focuses on making statistics on the distribution of signal power in frequency, and normalizing the data at different frequency resolutions to ensure that random signals are affected by the frequency resolution, so that the trend of power spectral density is consistent at different frequency resolutions. The kurtosis characteristic has good sensitivity but average stability, and the form factor has excellent stability but poor sensitivity, therefore, combining the two characteristics can improve the sensitivity to signal characteristics and also consider the stability.
(5) The method of the present disclosure identifies the support vector machine as a decision-making model, because it has a more solid theoretical foundation, and it is more suitable for model construction under limited sample conditions, with simple algorithms and better robustness, moreover, compared with a neural network model, the support vector machine converges to global optimum and will not fall into local optimum. Furthermore, the method of the present disclosure optimizes the kernel function parameters based on the Bayesian optimization method, which not only considers the prior parameter information, but also iterates continuously, involving limited number of iterations but fast iterations and grid search for non-convex optimization problems is prone to fall into local optimum, while the Bayesian optimization method has robustness.
(6) The method of the present disclosure can quickly identify the signal characteristics for evaluating the workpiece surface quality and display the surface quality status of the workpiece in real time, so as to achieve the purpose of improving the workpiece surface quality by changing the process parameters, which not only saves the testing cost, but also improves the testing efficiency and makes up for the technical defects that the condition monitoring cannot be performed during the machining process.

DETAILED DESCRIPTIONS OF THE EMBODIMENTS

The present disclosure will be described in detail below in conjunction with the accompanying drawings and the preferred embodiments, and the objectives and effects of the present disclosure will be more apparent. It should be understood that particular embodiments described herein are merely illustrative of the present disclosure and are not intended to limit the present disclosure.

Figure 1:
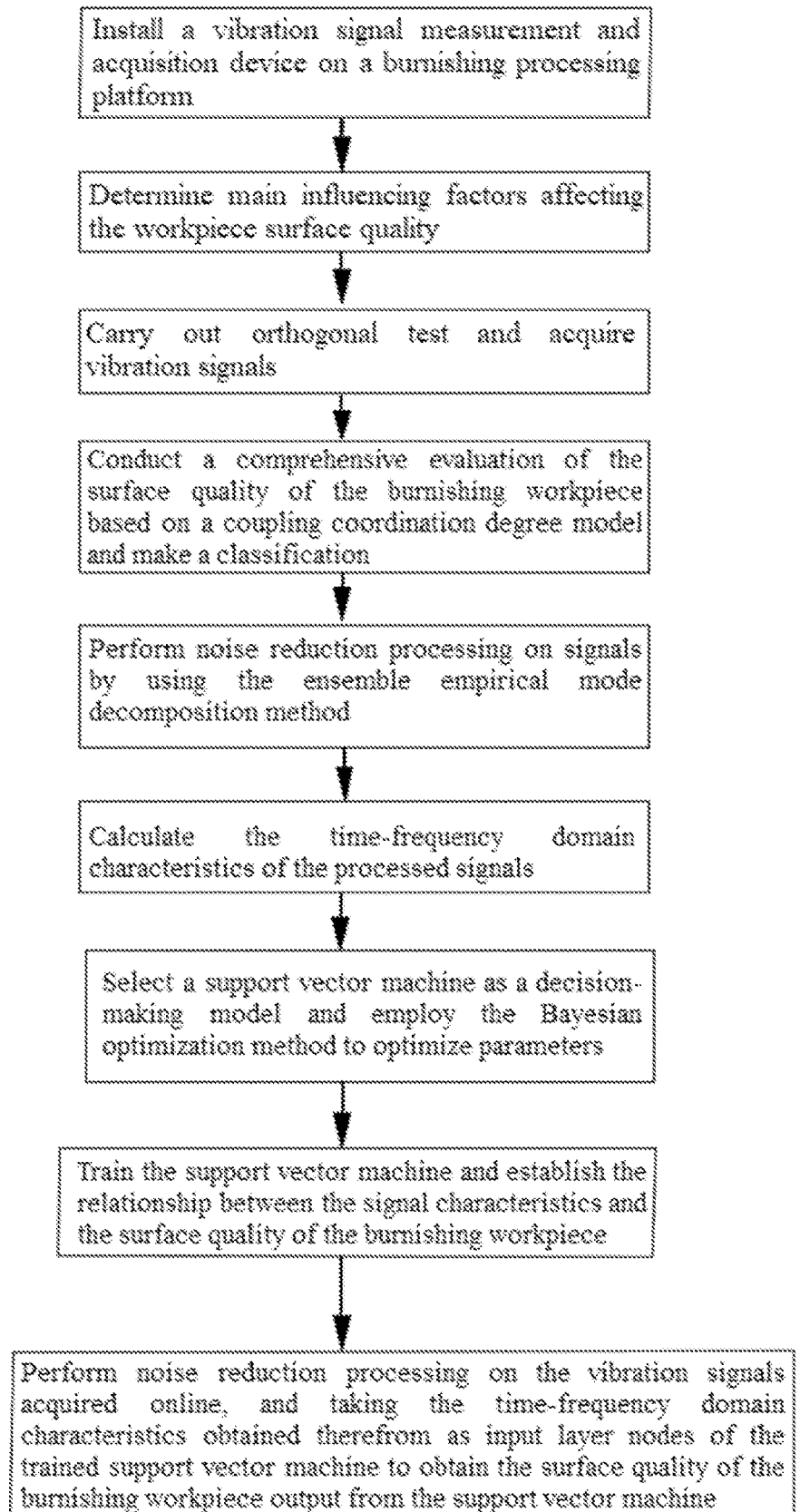
FIG. 1 is a flow diagram of an embodiment of the present disclosure.

As shown in FIG. 1, a method for predicting surface quality of a burnishing workpiece according to the present disclosure includes the following steps:

Step 1: a vibration signal measurement and acquisition device is installed on a burnishing processing platform:

a function of the workpiece clamping table is to clamp the workpiece and stably withstand vertical burnishing force, therefore, two vibration sensors are installed on one side of the workpiece clamping table, and at the same time, signal monitoring is performed on a machining direction and a vertical direction of the burnishing workpiece, the sensitivity is 100 mV/g, the scope of range is −50-50 g/pk, and the bandwidth is 2,048 Hz; and the other end of an vibration sensor is connected to a signal acquisition instrument and then connected to a computer, so as to facilitate subsequent steps.

Step 2: main influencing factors affecting surface quality of an ultrasonic burnishing workpiece are determined.

In this embodiment, rotational speed, feed speed and burnishing depth are taken as main influencing factors affecting the workpiece surface quality; and the above three factors are selected, and three levels are designed for each factor, as shown in Table 1.

TABLE 1

Factor Level Table

| Level | Rotational speed (rmp) | Feed speed (mm/min) | Burnishing depth (mm) |
|---|---|---|---|
| 1 | 1500 | 30 | 0.06 |
| 2 | 2500 | 90 | 0.06 |
| 3 | 3500 | 150 | 0.12 |

As shown in Table 2, a test scheme is designed according to the orthogonal test method, an ultrasonic burnishing test is performed, and vibration signals are captured.

TABLE 2

Table of $L_9 3^3$ Orthogonal Test Results

| S/N | Rotational speed (rmp) | Feed speed (mm/min) | Burnishing depth (mm) | Surface roughness increase (%) | hardness increase (%) |
|---|---|---|---|---|---|
| 1 | 1(1500) | 1(30) | 1(0.06) | 79.26% | 16.10% |
| 2 | 1(1500) | 2 (90) | 3 (0.12) | 9.54% | 26.98% |
| 3 | 1(1500) | 3 (150) | 2 (0.09) | 10.63% | 22.75% |
| 4 | 2 (2500) | 1(30) | 3 (0.12) | 5.81% | 44.30% |
| 5 | 2 (2500) | 2 (90) | 2 (0.09) | 27.82% | 44.03% |
| 6 | 2 (2500) | 3 (150) | 1(0.06) | 9.76% | 34.02% |
| 7 | 3 (3500) | 1(30) | 2 (0.09) | 22.83% | 21.72% |
| 8 | 3 (3500) | 2 (90) | 1(0.06) | 47.87% | 2.01% |
| 9 | 3 (3500) | 3 (150) | 3 (0.12) | 11.19% | 5.16% |

Based on a coupling coordination degree model, a comprehensive evaluation of the surface quality of the burnishing workpiece is conducted to obtain the comprehensive evaluation results of the surface quality of the burnishing workpiece, and the burnishing workpiece can be identified as excellent or poor according to the comprehensive evaluation results. Specific steps are as follows:

a. surface roughness increase and hardness increase are taken as analysis items of the coupling coordination degree model;

b. weights of the surface roughness increase and the hardness increase are set to make their weights both equal to 0.5, and interval processing on data of the analysis items are performed, and the data after the processing fall between 0 and 1;

c. a coupling degree C., a coordination index T and a coupling coordination degree D are calculated, and the coupling coordination degree is classified in combination with classification criteria for the coupling coordination degree grading. Specific formula is as follows:

coupling degree $$C = 2 \times \left[ \frac{U_1 \cdot U_2}{(U_1 + U_2)^2} \right]^{\frac{1}{2}}$$

coordination index $T = \omega_1 U_1 \omega v_2 U_2$ coupling coordination degree $D = \sqrt{C \times T}$ where, $\omega_1$ and $\omega_2$ are the weights, and $U_1$ and $U_2$ are the analysis items of the model.

TABLE 3

Calculation Results of Coupling Coordination Degree

| S/N | Coupling degree | Coordination index T | Coupling coordination degree D | Coordination level | Coupling coordination degree | Classification result |
|---|---|---|---|---|---|---|
| 1 | 0.870 | 0.663 | 0.760 | 8 | Intermediate Coordination | Excellent (+1) |
| 2 | 0.579 | 0.324 | 0.433 | 5 | Near maladjustment | Excellent (+1) |

TABLE 3-continued

Calculation Results of Coupling Coordination Degree

| S/N | Coupling degree | Coordination index T | Coupling coordination degree D | Coordination level | Coupling coordination degree | Classification result |
|---|---|---|---|---|---|---|
| 3 | 0.676 | 0.282 | 0.437 | 5 | Near maladjustment | Excellent (+1) |
| 4 | 0.199 | 0.500 | 0.315 | 4 | Mild maladjustment | Poor (−1) |
| 5 | 0.849 | 0.644 | 0.739 | 8 | Intermediate Coordination | Excellent (+1) |
| 6 | 0.533 | 0.407 | 0.466 | 5 | Near maladjustment | Excellent (+1) |
| 7 | 0.945 | 0.352 | 0.577 | 6 | Bare coordination | Excellent (+1) |
| 8 | 0.260 | 0.291 | 0.275 | 3 | Moderate maladjustment | Poor (−1) |
| 9 | 1.000 | 0.082 | 0.287 | 3 | Moderate maladjustment | Poor (−1) |

The greater the value of the coupling degree C. is, the greater the interaction between the surface roughness increase and the hardness increase becomes, and a greater value of the coupling coordination degree D indicates a good level between the surface roughness increase and the hardness increase. Maladjustment of the coupling coordination degree indicates that neither of them have a good level.

d. As shown in Table 3, the burnishing workpiece is classified according to the coupling coordination degree. When the coupling coordination degree is maladjustment, the surface quality of the burnishing workpiece is poor, otherwise, the surface quality of the burnishing workpiece is excellent.

Figure 2:
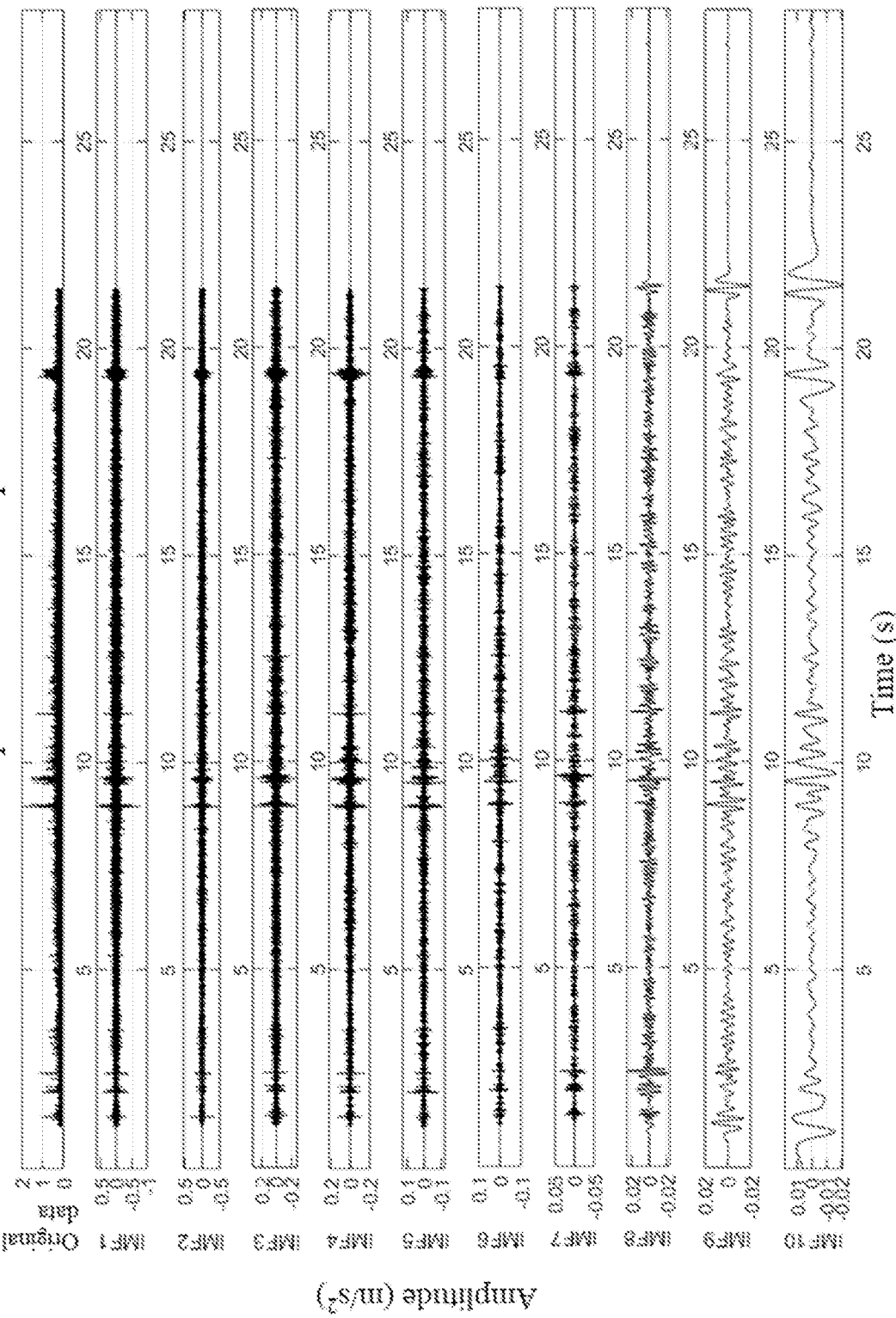
FIG. 2 illustrates modes of an Intrinsic Mode Function (IMF) 1-10 of an ensemble empirical mode decomposition of vibration signals according to an embodiment.
Figure 3:
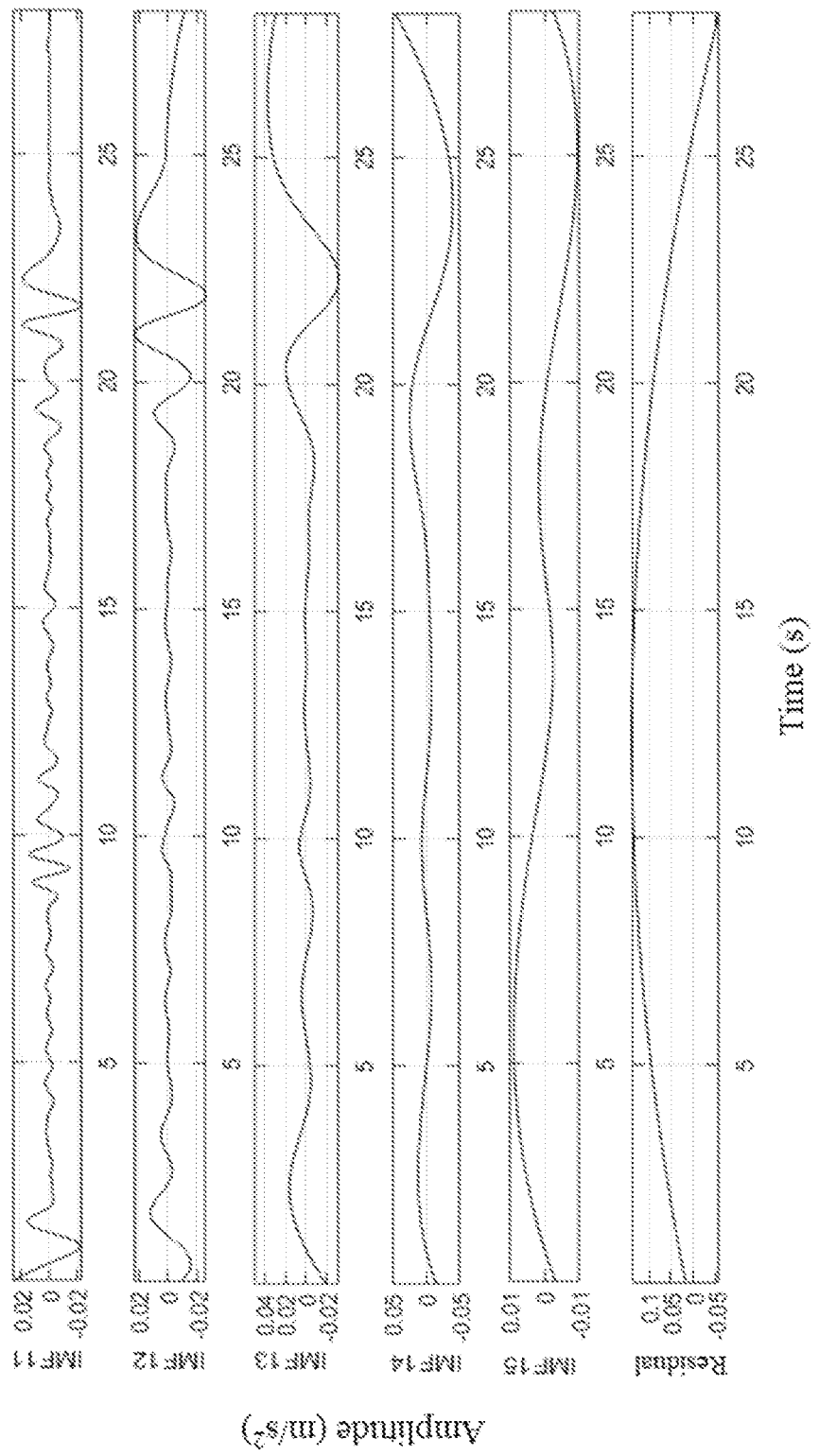
FIG. 3 illustrates modes of an IMF 11-15 of an ensemble empirical mode decomposition of vibration signals according to an embodiment.
Figure 4:
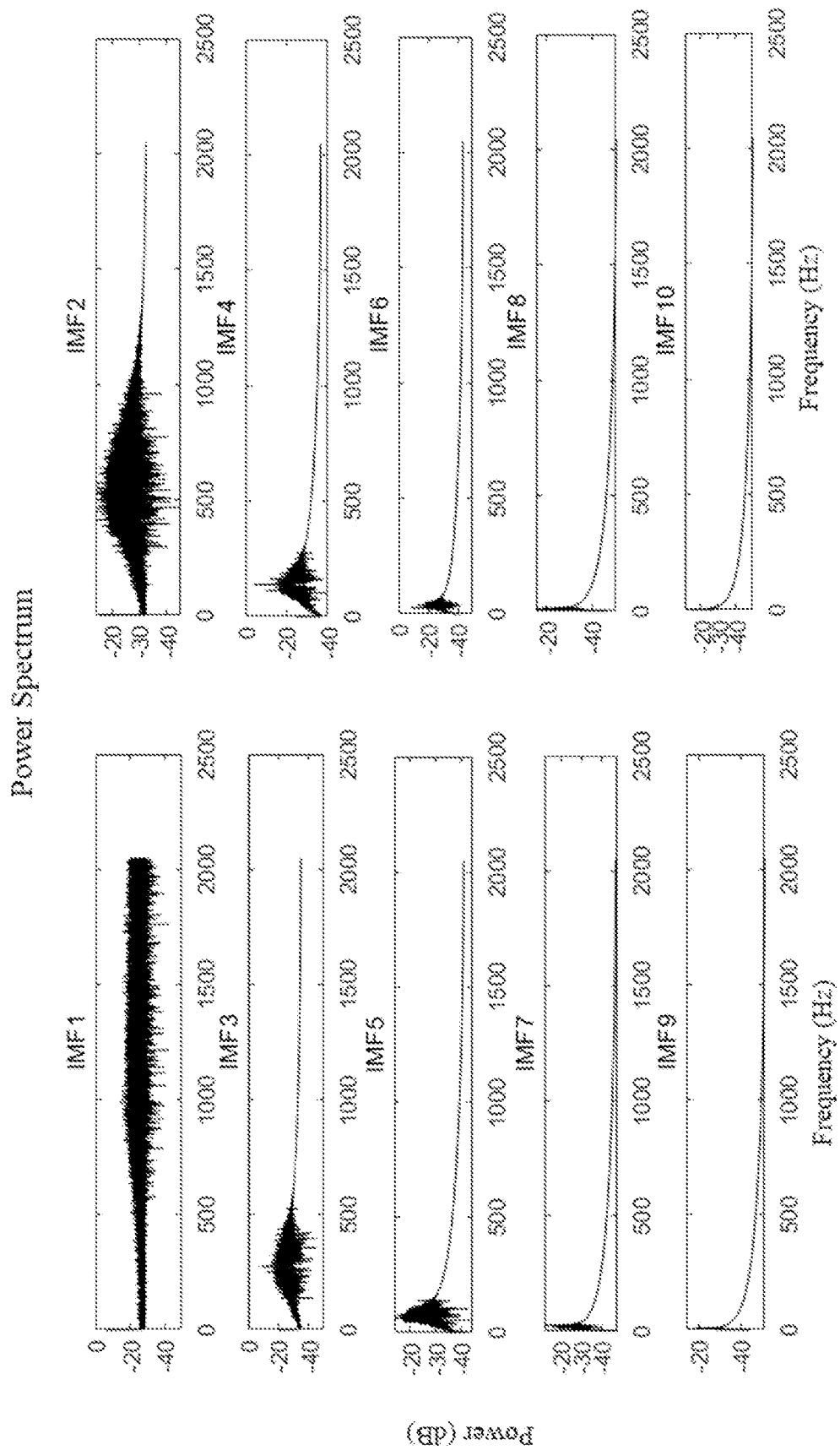
FIG. 4 is a power spectrum diagram of IMF 1-10 for each component signal according to an embodiment.
Figure 5:
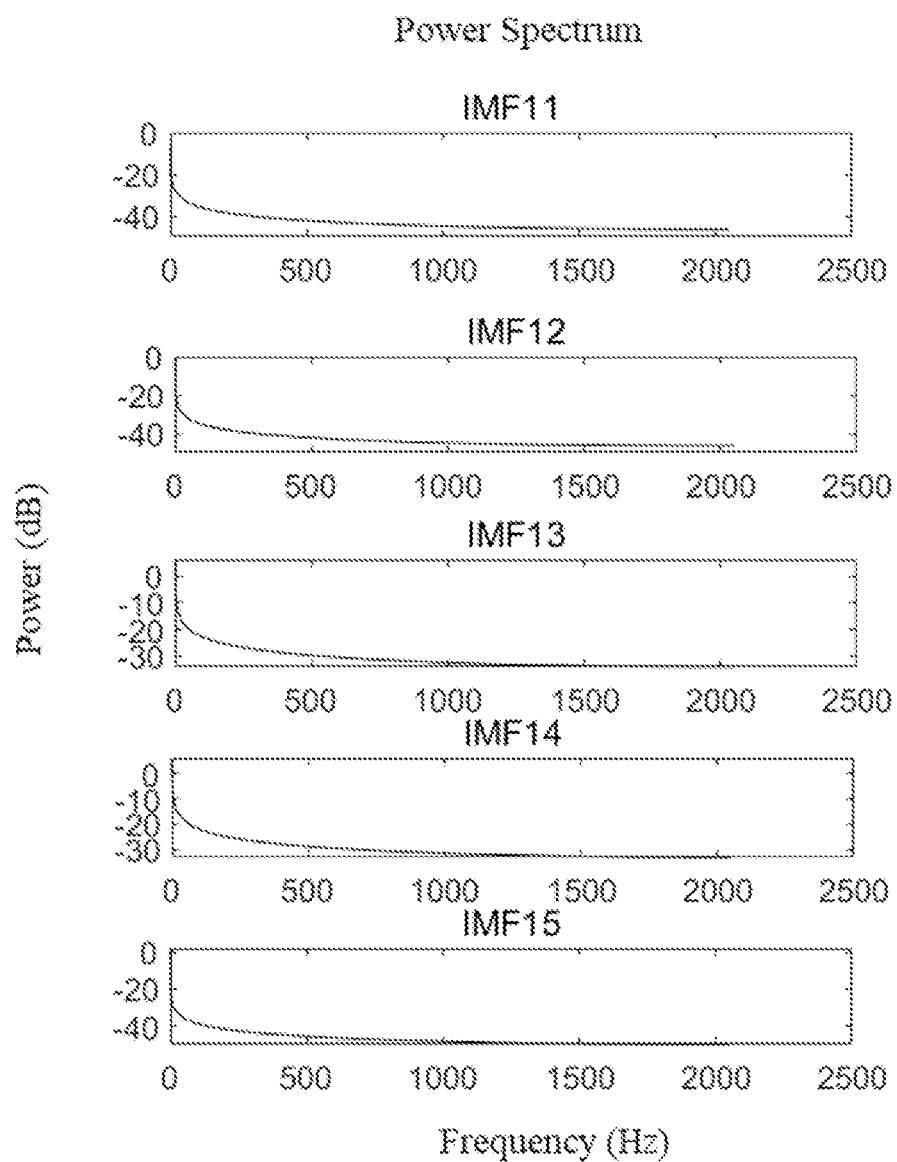
FIG. 5 is a power spectrum diagram of IMF 11-15 for each component signal according to an embodiment.
Figure 6:
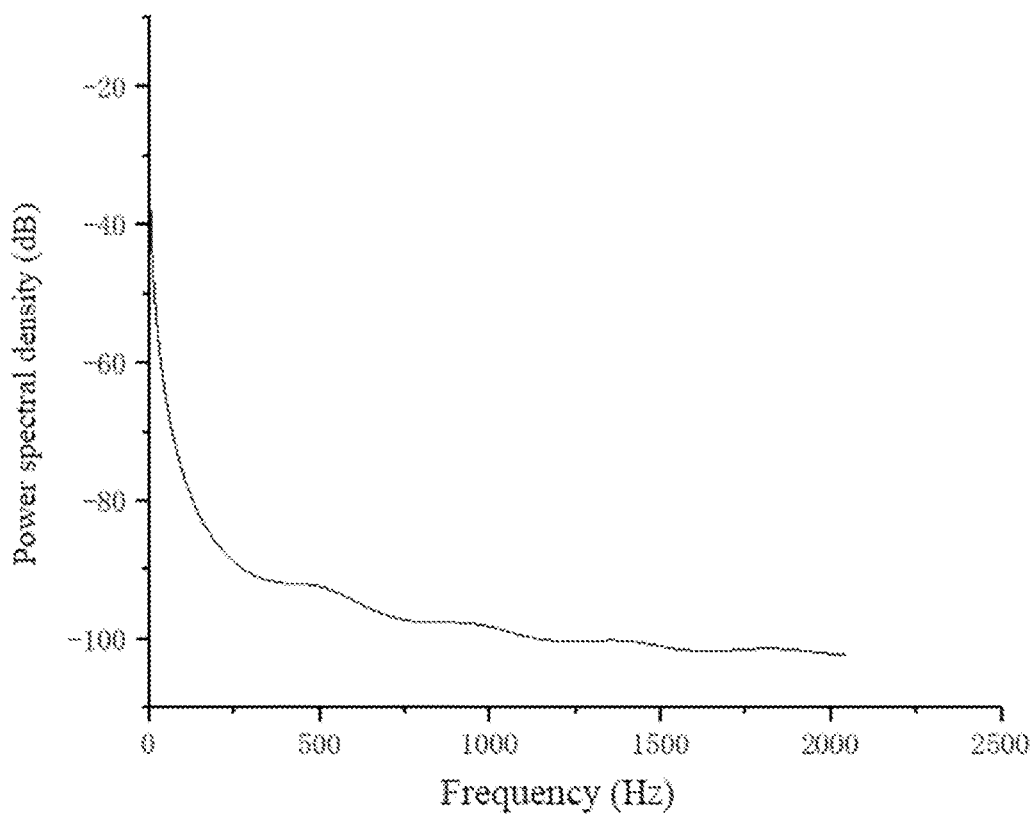
FIG. 6 is a diagram of a power spectral density estimated by the maximum entropy method according to an embodiment.

Step 3: vibration signals in different scales are divided by using the ensemble empirical mode decomposition method to achieve noise reduction; and component signals without noise interference are selected for superposition, and the time-frequency domain characteristics of superposed signals are calculated.

a. Small-amplitude noise signals are added to the vibration signals several times, random seeds are added to maintain consistency of decomposition results, selecting suitable average number of treatments and white noise amplitude are selected. The selection of white noise amplitude refers to the following formula:

$$\ln e + 0.5A_m \ln N = 0$$

where, e is the deviation of the vibration signals from the component signals, $A_m$ is the white noise amplitude, and N is the number of time the white noise added.

b. The vibration signals in time scale after multiple additions of white noise are divided by using the ensemble empirical mode decomposition method to obtain each component signal, as shown in FIGS. 2 and 3, that is, the ensemble empirical mode decomposition method is used to make division to obtain each component signal, and it can be seen that IMF 1-10 are high frequency signals, and IMF 11-15 are low frequency signals.

c. Plotting a power spectrum of each component signal is plotted, and shapes of the power spectrum of component signals are compared.

d. The power spectrum of each component signal with a smooth shape is selected, that is, the component signals without noise interference are superimposed to obtain superimposed signals, as shown in FIGS. 4-5, which are power spectrum of IMF 1-15. It can be seen from the figures that IMF 1-7 have more peaks in a power spectrum shape within the frequency scale, therefore, it can be determined that there are different degrees of noise interference, and power spectrum shapes of IMF 8-15 are relatively smoother, as a result, IMF 1-7 are discarded, and modal signals of IMF 8-15 are selected to be superimposed to obtain superimposed signals.

e. Power spectral density, kurtosis and form factor are identified as the time-frequency domain characteristics of the superimposed signals, and the power spectral density of the superimposed signals is estimated based on the maximum entropy method, as shown in FIG. 6, so that the power spectral density estimated by the maximum entropy method. The formula is as follows:

$$s(f) = \frac{\Delta t P_m}{\left|1 + \sum_{k=1}^{m} a_k e^{-2\pi j k \Delta t f}\right|^2}$$

where, $P_m$ is a power of processed signals, $\Delta t$ is a time interval of equidistant sampling of a vibration signal time series, $a_k$ is an autoregressive coefficient, $f$ is a frequency of the processed signals, m is an autoregressive order, k is a number from 1-m, and j is an imaginary unit.

The kurtosis K of the superimposed signals is calculated according to the following formula:

$$K = \frac{1}{N}\sum_{n=1}^{N}\left(\frac{x_n - \mu}{\sigma}\right)^4$$

In the above formula, n is a number from 1-N, $x_n$ represents an amplitude of a signal time series, μ is a mean value of the signal time series, N is a length of the signal time series, and σ is a standard deviation.

The form factor $S_f$ of the superimposed signals is calculated according to the following formula:

$$S - f = \frac{X_{RMS}}{|X|}$$

where, $|X|$ is a mean value of absolute values of the signals, and $X_{RMS}$ is a root mean square of the signals.

Figure 7:
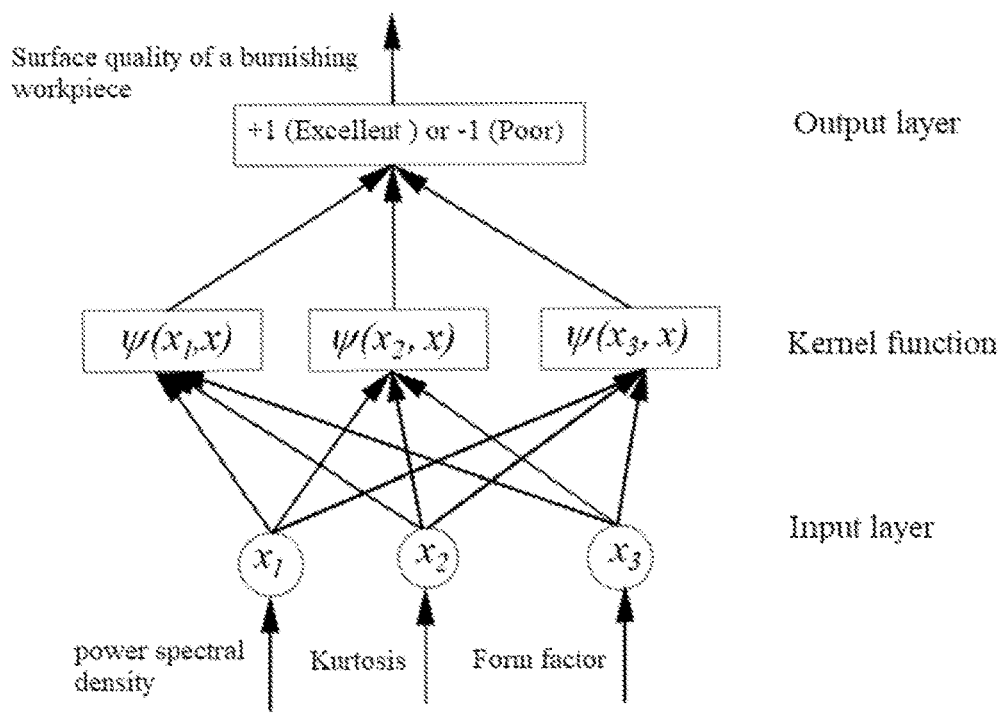
FIG. 7 is a structural schematic diagram of a support vector machine used in an embodiment.

Step 4: a support vector machine is selected as a decision-making model of the workpiece surface quality, a radial basis function is selected as a kernel function, an optimal selection range of penalty parameters and kernel function parameters are determined, and these two parameters are optimized based on Bayesian optimization method to obtain a best value. FIG. 7 illustrates the support vector machine structure adopted in this embodiment.

The formula of a radial basis kernel function is as follows:

$$\psi(x_m, x_n) = e^{-\gamma \|x_m - x_n\|^2}$$

where, $(x_m, x_n)$ a sample set, $x_m$ is an input vector, and $\gamma$ is a kernel function parameter.

Selection ranges of the penalty parameters and the kernel function parameters are set to $0.001 < C < 1000$ and $0.001 < \gamma < 1000$, respectively.

Figure 8:
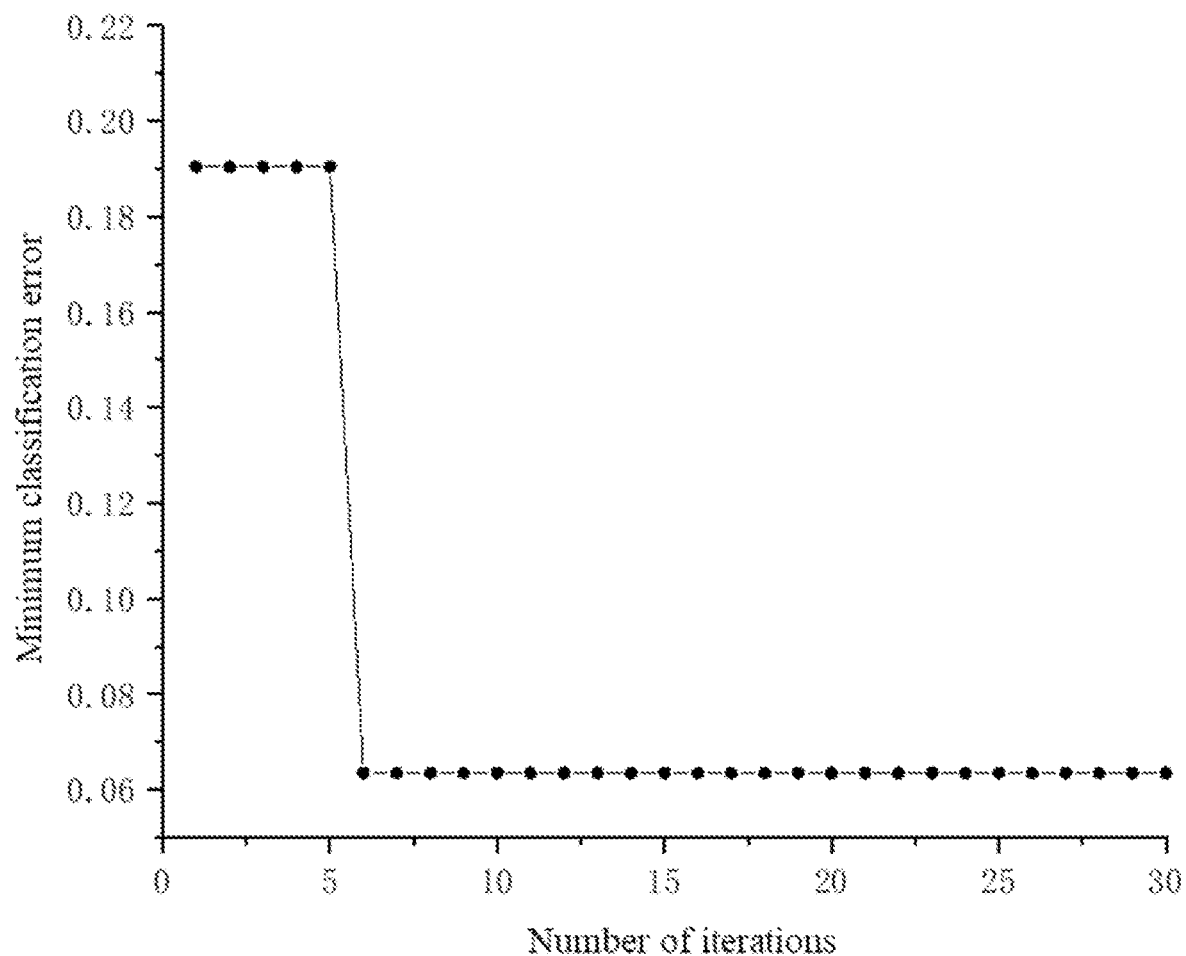
FIG. 8 is a schematic diagram of variations in minimum classification errors with the number of iterations for Bayesian optimization method according to an embodiment.

As shown in FIG. 8, the minimum classification error obtained through optimization by the Bayesian optimization method has 30 number of iterations, iterated from the initial classification error of 0.190 to 0.063 after iterations, so that the smallest value of the minimum classification error is obtained, indicating that the Bayesian optimization method has an obvious optimization process for the parameters, which can effectively improve the accuracy of the model.

Step 5: the time-frequency domain characteristics of the superimposed signals are identified as input layer nodes of the support vector machine, the surface quality classification results are taken as output layer nodes thereof to train the support vector machine and obtain a trained support vector machine, so that the relationship between the signal characteristics and the surface quality of the burnishing workpiece is established. An output value of the support vector machine is set to be +1 when the surface quality of the burnishing workpiece is excellent, and the output value of the support vector machine is set to be −1 when the surface quality is poor.

Step 6: Step 3 is carried out for the vibration signals collected online in the burnishing test, and the time-frequency domain characteristics of the processed signals are taken as input layer nodes of the trained support vector machine to obtain the surface quality of the burnishing workpiece output from the support vector machine.

Test results are shown in Table 4.

TABLE 4

Test Results of the Support Vector Machine

| S/N | Rotational speed (rmp) | Feed speed (mm/min) | Burnishing depth (mm) | Classification result | Testing result |
|-----|------------------------|---------------------|-----------------------|----------------------|----------------|
| 1 | 1 (1500) | 1 (30) | 1 (0.06) | Excellent (+1) | Excellent (+1) |
| 2 | 1 (1500) | 2 (90) | 3 (0.12) | Excellent (+1) | Excellent (+1) |
| 3 | 1 (1500) | 3 (150) | 2 (0.09) | Excellent (+1) | Excellent (+1) |
| 4 | 2 (2500) | 1 (30) | 3 (0.12) | Poor (−1) | Excellent (+1) |
| 5 | 2 (2500) | 2 (90) | 2 (0.09) | Excellent (+1) | Excellent (+1) |
| 6 | 2 (2500) | 3 (150) | 1 (0.06) | Excellent (+1) | Excellent (+1) |
| 7 | 3 (3500) | 1 (30) | 2 (0.09) | Excellent (+1) | Excellent (+1) |
| 8 | 3 (3500) | 2 (90) | 1 (0.06) | Poor (−1) | Poor (−1) |
| 9 | 3 (3500) | 3 (150) | 3 (0.12) | Poor (−1) | Poor (−1) |

As can be seen from the above table, only the burnishing workpiece numbered 4 has errors, and this burnishing workpiece falls within the category of poor surface quality according to the previous classification results, but falls within the category of excellent surface quality after being tested by the support vector machine. Therefore, the accuracy of the support vector machine model can reach 88.9%.

It can be understood by those skilled in the art that the above is only a preferred embodiment of the present disclosure, and is not intended to limit the present disclosure. Although the present disclosure has been described in detail with reference to the above embodiment, for those skilled in the art, it is still apparent that the technical solutions described in the above embodiment may be modified, or some technical features thereof may be equivalently replaced. Any modifications, equivalent substitutions, improvements, and the like within the spirit and principles of the present disclosure are intended to be included within the scope of protection of the present disclosure.

What is claimed is:

1. A method for predicting surface quality of a burnishing workpiece, comprising the following steps:
    step 1: installing a vibration signal measurement and acquisition device on a burnishing processing platform;
    step 2: determining main influencing factors affecting a surface quality of a burnishing workpiece and the number of each influencing factor, designing orthogonal tests with different combinations of influencing factors and levels, performing burnishing tests and acquiring vibration signals, carrying out a comprehensive evaluation of the surface quality of the burnishing workpiece based on a coupling coordination degree model, and classifying the burnishing workpiece according to the comprehensive evaluation results;
    step 3: dividing vibration signals in different scales by using an ensemble empirical mode decomposition method to achieve noise reduction; and selecting component signals without noise interference for superposition, and calculating the time-frequency domain characteristics of superposed signals;
    step 4: selecting a support vector machine as a decision-making model of the workpiece surface quality, selecting a radial basis function as a kernel function, determining an optimal selection range of penalty parameters and kernel function parameters, and optimizing these two parameters based on Bayesian optimization method to obtain a best value;
    step 5: taking the time-frequency domain characteristics of the signals obtained in the step 3 as input layer nodes of the support vector machine, taking the surface quality classification results obtained in the step 2 as output layer nodes thereof to train the support vector machine and obtain a trained support vector machine, so that a relationship between the signal characteristics and the surface quality of the burnishing workpiece is established; and step 6: carrying out step 3 for the vibration signals collected online in the burnishing test, and taking the time-frequency domain characteristics finally obtained as input layer nodes of the trained support vector machine to obtain the surface quality of the burnishing workpiece output from the support vector machine, wherein in the step 2, a comprehensive evaluation of the surface quality index of the burnishing workpiece is conducted based on a coupling coordination degree model, and the burnishing workpiece is configured to be classified according to the comprehensive evaluation results, with specific steps as follows:

(1) taking a surface roughness increase and a hardness increase as analysis items of the coupling coordination degree model;

(2) setting weights of the surface roughness increase and the hardness increase, performing interval processing on data of the analysis items, and ensuring the data after the processing fall between 0 and 1;

(3) calculating a coupling degree, a coordination index and a coupling coordination degree, and classifying the coupling coordination degree in combination with classification criteria for the coupling coordination degree grading; and (4) classifying the burnishing workpiece according to the coupling coordination degree, when the coupling coordination degree is maladjustment, the surface quality of the burnishing workpiece is poor, otherwise, the surface quality of the burnishing workpiece is excellent;

wherein the step 3 is implemented through the following sub-steps:

(1) adding small-amplitude white noise signals to the vibration signals several times, and adding random seeds to maintain consistency of decomposition results;

(2) dividing the vibration signals in time scale after multiple additions of white noise by using the ensemble empirical mode decomposition method to obtain component signals;

(3) plotting a power spectrum of each component signal and comparing a shape of the power spectrum of each component signal;

(4) selecting the power spectrum of each component signal with a smooth shape, that is, the component signals without noise interference, and superimposing these signals to obtain superimposed signals; and (5) identifying power spectral density, kurtosis and form factor as the time-frequency domain characteristics of the superimposed signals, and estimating the power spectral density of the superimposed signals based on a maximum entropy method.

2. The method for predicting surface quality of a burnishing workpiece according to claim 1, wherein in the step 1, the vibration signal measurement and acquisition device comprises two vibration sensors and one signal acquisition instrument, wherein the two vibration sensors are respectively used to monitor vibration signals on a machining direction and a vertical direction of the burnishing workpiece, and the signal acquisition instrument is used to acquire such signals.

3. The method for predicting surface quality of a burnishing workpiece according to claim 1, wherein in the step 2, rotational speed, feed speed and burnishing depth are taken as main influencing factors affecting the workpiece surface quality.

4. The method for predicting surface quality of a burnishing workpiece according to claim 1, wherein selection ranges of the penalty parameters C and kernel function parameters y in the Step 4 are set to $0.001<C<1000$ and $0.001<\gamma<1000$, respectively.

5. The method for predicting surface quality of a burnishing workpiece according to claim 1, wherein in the step 5, an output value of the support vector machine is set to be +1 when the surface quality of the burnishing workpiece is excellent, and the output value of the support vector machine is set to be −1 when the surface quality is poor.

* * * * *